(12) United States Patent
Müller et al.

(10) Patent No.: US 7,531,598 B2
(45) Date of Patent: May 12, 2009

(54) PROCESS FOR PRODUCING DETACHABLE DIRT- AND WATER-REPELLENT SURFACE COATINGS

(75) Inventors: Felix Müller, Velbert (DE); Edwin Nun, Billerbeck (DE); Patrick Winter, Essen (DE)

(73) Assignee: Goldschmidt GmbH, Essen (DE)

(*) Notice: Subject to any disclaimer, the term of this patent is extended or adjusted under 35 U.S.C. 154(b) by 375 days.

(21) Appl. No.: 11/451,868

(22) Filed: Jun. 13, 2006

(65) Prior Publication Data

US 2006/0235143 A1  Oct. 19, 2006

Related U.S. Application Data

(62) Division of application No. 10/740,346, filed on Dec. 18, 2003, now Pat. No. 7,083,828.

(30) Foreign Application Priority Data

Apr. 24, 2003   (EP) ................................. 03009302

(51) Int. Cl.
C08L 83/04 (2006.01)
C04B 41/49 (2006.01)
C07F 7/18 (2006.01)

(52) U.S. Cl. .............. 524/588; 106/287.1; 106/287.13; 524/267

(58) Field of Classification Search ................. 524/588
See application file for complete search history.

(56) References Cited

U.S. PATENT DOCUMENTS

| | | | |
|---|---|---|---|
| 3,354,022 A | | 11/1967 | Dettre et al. |
| 4,226,858 A | * | 10/1980 | Pfirrmann et al. ........... 424/725 |
| 4,574,082 A | * | 3/1986 | Tietjen et al. ................ 424/63 |
| 4,936,914 A | * | 6/1990 | Hurley et al. ................ 106/3 |
| 5,225,188 A | * | 7/1993 | Abrutyn et al. .............. 424/66 |
| 5,541,048 A | * | 7/1996 | Whitesides et al. ......... 430/523 |
| 5,599,489 A | | 2/1997 | Saiki et al. |
| 5,876,894 A | * | 3/1999 | Leclair .................... 430/108.2 |
| 5,922,308 A | * | 7/1999 | Brewster et al. .............. 424/65 |
| 6,015,548 A | * | 1/2000 | Siddiqui et al. .............. 424/59 |
| 6,060,547 A | * | 5/2000 | Canter et al. ................ 524/280 |
| 6,156,409 A | | 12/2000 | Doushita et al. |
| 6,352,688 B1 | * | 3/2002 | Scavone et al. .............. 424/65 |
| 6,361,765 B1 | * | 3/2002 | Emslie et al. ................ 424/65 |
| 6,410,001 B1 | * | 6/2002 | Franklin et al. .............. 424/65 |
| 6,432,181 B1 | | 8/2002 | Ludwig |
| 6,464,964 B1 | * | 10/2002 | Brieva et al. ................. 424/59 |
| 6,475,500 B2 | * | 11/2002 | Vatter et al. ................ 424/401 |
| 6,551,525 B2 | | 4/2003 | Hofmann et al. |
| 6,811,856 B2 | | 11/2004 | Nun et al. |
| 6,827,929 B1 | * | 12/2004 | Lord et al. ............... 424/78.06 |
| 6,852,389 B2 | | 2/2005 | Nun et al. |
| 6,858,284 B2 | | 2/2005 | Nun et al. |
| 2002/0018790 A1 | * | 2/2002 | Vatter et al. ................ 424/401 |
| 2002/0028223 A1 | * | 3/2002 | Vatter et al. ................ 424/401 |

FOREIGN PATENT DOCUMENTS

| | | |
|---|---|---|
| BE | 834962 | 5/1960 |
| CH | 268 258 | 8/1950 |
| EP | 0 909 747 A1 | 4/1999 |
| EP | 0 928 818 | 7/1999 |
| EP | 0 933 388 B1 | 8/1999 |
| EP | 1 048 696 | 11/2000 |
| EP | 101 18 346 A1 | 10/2002 |
| EP | 101 18 348 A1 | 10/2002 |
| EP | 101 35 157 A1 | 2/2003 |
| EP | 1 657 283 | 5/2006 |
| JP | 6-287515 | 10/1994 |
| JP | 2000-104047 | 4/2000 |
| JP | 2000-191786 | 7/2000 |
| KR | 1994-0002567 | 10/1992 |
| WO | WO 96/04123 | 2/1999 |
| WO | WO 00/58410 | 10/2000 |
| WO | WO 2006/045012 | 4/2006 |

OTHER PUBLICATIONS

Saito H. et al., "Water-and Ice-Repellent Coatings", *Surface Coatings International*, 4:168-171 (1997).
Müller F. et al., "Clean Surfaces with the Lotus-Effect", *Communications Presentadas a Las Jornadas Del Comite Espanol de La Detergencia*, 34:103-111 (2004).
Barthlott W. et al., "Purity of the Sacred Lotus, or Escape from Contamination in Biological Surfaces", *Planta*, 202(1):1-8 (1997).
Furstner R. et al., "Lotus Effect. Self-Cleaning Microstructured Surface Area", *Nachrichten Aus Der Chemie*, 48(1):24-28 (2000).
Barthel, H., "Surface interactions of dimethylsiloxy group-modified fumed silica," 1995, Colloids and Surfaces 101, XP002472173, p. 218, paragraph 7- p. 219, paragraph 3, p. 219 paragraph 7.
"Permeable silicone based water repellent composition—comprises petroleum benzene, oligomeric siloxane, and fumed silica, " Derwent, 1994, XP002207454, Abstract only.
English-language abstract of Japanese Patent Application No. 2000 044226 dated Feb. 15, 2000.
English-language abstract of Japanese Patent Application No. 2002 256170 dated Sep. 11, 2002.
English-language abstract of Japanese Patent Application No. 07 286095 dated Oct. 31, 1995.

* cited by examiner

*Primary Examiner*—Randy Gulakowski
*Assistant Examiner*—Robert Loewe
(74) *Attorney, Agent, or Firm*—Scully, Scott, Murphy & Presser, P.C.

(57) ABSTRACT

Process for producing detachable dirt- and water-repellent surface coatings on articles, wherein during the coating process, hydrophobic particles are applied to the surface of the articles, thus generating a surface structure with elevations on that surface of the articles that has dirt- and water-repellent properties, which comprises suspending the hydrophobic particles in a solution of a silicone wax in a highly volatile siloxane, and applying this suspension to at least one surface of an article, and then removing the highly volatile siloxane.

7 Claims, No Drawings

PROCESS FOR PRODUCING DETACHABLE DIRT- AND WATER-REPELLENT SURFACE COATINGS

CROSS REFERENCE TO RELATED APPLICATIONS

The present application is a divisional of application Ser. No. 10/740,346 filed on Dec. 18, 2003 now U.S. Pat. No. 7,083,828.

FIELD OF THE INVENTION

The present invention relates to a process for producing dirt- and water-repellent surface coatings on articles, wherein during the coating process hydrophobic particles are applied to the surface of the articles, thus generating a surface structure with elevations on that surface of the articles that has dirt- and water-repellent properties.

BACKGROUND OF THE INVENTION

The principle of self-cleaning coatings is well-known To achieve good self-cleaning of a surface, the surface not only has to be very hydrophobic, but also has to have some degree of roughness. A suitable combination of structure and hydrophobic properties permits even small amounts of water moving on the surface to entrain adherent dirt particles and clean the surface (see, for example, WO-A-96/04123; U.S. Pat. No. 3,354,022).

The prior art of EP-B-0 933 388 requires an aspect ratio>1 and a surface energy of less than 20 mN/m for these self-cleaning surfaces; the aspect ratio being defined here as the quotient which is the ratio of the height of the structure to its width. The abovementioned criteria are typically found in nature, for example, in the lotus leaf. The surface of the plant is composed of a hydrophobic waxy material and has elevations separated by a few μm. Water droplets substantially contact only the peaks of the elevations. There are many descriptions in the literature of water-repellent surfaces of this type.

Swiss patent 268 258 describes a process which generates structured surfaces by applying powders, such as, for example, kaolin, talc, clay, or silica gel. Oils and resins based on organosilicon compounds (Examples 1 to 5 of the Swiss patent) are used to secure the powders to the surface.

EP-A-0 909 747 teaches a process for generating a self-cleaning surface. The surface has hydrophobic elevations whose height is from 5 to 200 μm. A surface of this type is produced by applying a dispersion of pulverulent particles and of an inert material in a siloxane solution and then curing. The structure-forming particles are therefore secured to the surface by way of an auxiliary medium.

WO-A-00/58410 concludes that it is technically possible to render the surfaces of articles artificially self-cleaning. The surface structures necessary for this purpose, which are composed of elevations and depressions, have a separation in the range from 0.1 to 200 μm between the elevations of the surface structures, and have an elevation height in the range from 0.1 to 100 μm. The materials used for this purpose are composed of hydrophobic polymers or of lastingly hydrophobicized material. Release of the particles from the carrier matrix has to be prevented.

The use of hydrophobic materials, such as perfluorinated polymers, to produce hydrophobic surfaces is known. A further development of these surfaces consists in structuring the surfaces in the μm to nm range. U.S. Pat. No. 5,599,489 discloses a process in which a surface can be rendered particularly repellent by bombardment with particles of appropriate size, followed by perfluorination. H. Saito et al. in "Surface Coatings International", 4, 1997, pp. 168 et seq., describe another process, in which particles composed of fluoropolymers are applied to metal surfaces, giving the surfaces thus generated markedly lower wettability with respect to water, with considerably reduced tendency toward icing.

This principle has been borrowed from nature. Small contact surfaces lower the level of vanderWaals interaction responsible for adhesion to flat surfaces with low surface energy. For example, the leaves of the lotus plant have elevations composed of a wax, and these reduce the area of contact with water.

Process for producing these structured surfaces are likewise known. Besides the use of a master structure to mold these structures in full detail by injection molding or embossing processes, there are also known processes that utilize the application of particles to a surface. This is disclosed, for example, in U.S. Pat. No. 5,599,489.

Recently, attempts have been made to provide self-cleaning surfaces on textiles. It has been found that self-cleaning surfaces can be generated by applying fine-particle $SiO_2$ (Aerosils) to textiles. In this process, the Aerosils are bonded into the polymer matrix of the textile fiber, using a solvent DE-A-101 18 348 describes polymer fibers with self-cleaning surfaces. In the prior art disclosure, the self-cleaning surface is obtained by exposure to a solvent, which comprises structure-forming particles, using the solvent to solvate the surface of the polymer fibers, adhesion of the structure-forming particles to the solvated surface, and removing the solvent The disadvantage of this process is that, during processing of the polymer fibers (spinning, knitting, etc.), the structure-forming particles, and therefore the structure that renders the surface self-cleaning, can become damaged or sometimes lost entirely, the result being that the self-cleaning effect is also lost.

DE-A-101 18 346 describes textile sheets with a self-cleaning and water-repellent surface composed of at least one synthetic and/or natural textile base material A, and of an artificial, at least to some extent, hydrophobic surface with elevations and depressions composed of particles that have been securely bonded to the base material A without adhesives, resins, or coatings. The hydrophobic surfaces are obtained by treating the base material A with at least one solvent that comprises the undissolved particles, and removing the solvent, whereupon at least some of the particles become securely bonded to the surface of the base material A. However, the disadvantage of this prior art process is the very complicated finishing of the textile surfaces. Moreover, this prior art process requires precise matching of the solvent to the base material of the textiles. However, in clothing there are generally mixed fabrics present, and this matching therefore becomes more complicated. If the matching of the solvents is not precise, the result can be irreparable damage to parts of the clothing. The textile surfaces therefore have to be treated prior to tailoring.

All of these coatings have the disadvantage that they are applied permanently to the articles and can therefore not be simply removed and reapplied in the event of impairment by scratching or discoloration or any other damage to the surface or surface structure. If this type of damage occurs, the article either has to be freed from the surface structure by a complicated method and retreated, or has to be disposed of.

WO-A-00/58410 describes a process for producing detachable coatings with dirt- and water-repellent properties. These coatings of the prior art are produced by spray-application of hydrophobic alcohols, such as nonacosan-10-ol, or of alkanediols, such as nonacosane-5,10-diol, or of waxes. The coatings of WO-A-00/58410 can be removed from articles by strong mechanical forces, e.g. scratching, brushing, or high-pressure water treatment, or by treatment with water which comprises detergents that disperse some of the structure-formers. A disadvantage of the prior art coatings disclosed in WO-A-00/58410 is the strong forces needed for mechanical removal of the coating. The use of strong forces for the mechanical removal of the coating runs the risk that when the coating is removed the article itself will also be damaged. Treatment with water that comprises detergents can likewise lead to damage to the article, depending on its nature.

DE-A-101 35 157 describes a process for the coating of textiles during a dry-cleaning procedure, in which structure-forming particles are added to the cleaning agent. The cleaning agents proposed comprise organic solvents that are relatively hazardous to ones health, e.g. trichloroethylene, and the use of the proposed cleaning agents leads to mechanical anchoring of the particles to the structure of the textiles. The result can be damage to the article to be coated.

It was therefore an object of the present invention to provide a process which can produce dirt- and water-repellent surface coatings on articles, and which can also treat articles composed of unstable materials to give a relatively stable coating, which, however, can be detached using simple means.

SUMMARY OF THE INVENTION

Surprisingly, it has been found that application of suspensions which comprise hydrophobic particles in a solution of a silicone wax in a highly volatile siloxane to at least one surface of an article, followed by removal of the highly volatile siloxane, can give coatings with dirt- and water-repellent properties which are relatively stable but can also be removed using simple means.

The present invention therefore provides a process for producing detachable dirt- and water-repellent surface coatings on articles, wherein during the coating process hydrophobic particles are applied to the surface of the articles, thus generating a surface structure with elevations on that surface of the articles that has dirt- and water-repellent properties. The process of the present invention comprises suspending hydrophobic particles in a solution of a silicone wax in a highly volatile siloxane, applying this suspension to at least one surface of an article, and then removing the highly volatile siloxane.

The present invention also provides articles of which at least one surface has been treated with a water- and dirt-repellent coating produced by the process of the present invention.

The present invention also provides a non-permanent protective coating with water- and dirt-repellent properties for articles, the protective coating being capable of removal from the article in a simple manner.

The present invention further provides the use of the inventive process for the coating of articles that are exposed to high levels of contamination by dirt and water, in particular for the outdoor sector, the sports sector, for example ski sports, motor sports, sailing sports; for the coating of textiles, such as tents, awnings, umbrellas, table cloths, cabriolet covers, technical textiles, or workware, and also the use of the inventive processing impregnating sprays.

DETAILED DESCRIPTION OF THE INVENTION

The present invention describes a process that can produce detachable dirt- and water-repellent coatings.

The present invention has the advantage that articles of any type can be treated in a simple manner with a non-permanent dirt- and water-repellent layer.

In contrast to processes of the prior art, the inventive coating process using a detachable dirt-repellent layer that is relatively non-aggressive, because no hazardous or aggressive solvents are used, and because a mechanical means, such as friction, can be used to detach the coating.

The coating produced by means of the process of the present invention is non-permanent, and is therefore particularly well suited to function as a coating that protects new articles from soiling, e.g. during transport or in the sales areas.

In the process for producing detachable dirt- and water-repellent surface coatings on articles, wherein hydrophobic particles are applied to the surface of the articles during the coating process, thus generating a surface structure with elevations on that surface of the articles that has dirt- and water-repellent properties, hydrophobic particles are suspended in a solution of a silicone wax in a highly volatile siloxane. This suspension is then applied to at least one surface of an article, and the highly volatile siloxane is then removed.

Highly volatile siloxanes that may be used in the present invention are any linear compounds that are liquid at room temperature and have the general formula (I) and/or cyclic compounds of the general formula (Ia)

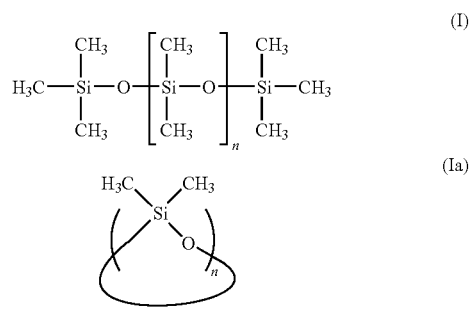

where n is a number from 2 to 10, and for the linear compounds is preferably from 2 to 5, and for the cyclic compounds is preferably ≧4, particularly >5 (an example being D5=decamethylpentacyclosiloxane), and/or from ≧6 to approximately ≧8.

A mixture of cyclic or of linear siloxanes may also be used in the present invention, and a mixture of cyclic with linear siloxanes may preferably be used.

Silicone waxes that may be used are any compounds which are liquid at room temperature, i.e. which have a recrystallization point below room temperature of about 20° C., preferably <15° C., in particular <5° C., in particular those of the general formula (II)

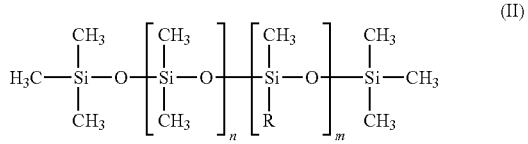

(II)

where

R is a hydrocarbon radical, preferably having from 10 to 20 carbon atoms, n is from 2 to 85, and m is from 2 to 60.

The suspension may be applied to at least one surface of an article in a manner known to one skilled in the art. The suspension is preferably applied by dipping the article into the suspension, and then permitting the material to run off, or by spray-application of the suspension to the article. Surprisingly, particularly durable coatings that are relatively resistant to scratching and abrasion can be generated, in particular on polymer surfaces, particularly when the suspension is spray-applied.

In the spraying procedure, the kinetic energy of the particles results in increasingly secure embedment of the particles into the surface roughness present on the polymer matrix. The means of spray-application of the suspension is preferably a sprayer that has a nozzle whose diameter is from 0.05 to 2 mm, preferably from 0.1 to 0.9 mm. A pressure from 1 to 5 bar is preferably used to spray the suspension.

The volatile siloxane is removed by evaporation or volatilization, and this evaporation or volatilization can be accelerated by using elevated temperatures, or by using sub-atmospheric pressure or vacuum.

Particles that may be used are those which comprise at least one material selected from silicates, minerals, metal oxides, metal powders, silicas, pigments, or polymers. The particles may preferably be silicates, doped silicates, minerals, metal oxides, aluminum oxide, silicas, or fumed silicates, Aerosols, or pulverulent polymers, e.g. spray-dried and agglomerated emulsions, or cryogenically milled PTFE (Teflon). The hydrophobic particles used preferably comprise hydrophobically coated silicas. In addition to hydrophobicized silicas, hydrophobicized zinc oxide, titanium dioxide or mixtures thereof can be employed.

The hydrophobic particles employed in the present invention have a fine structure in the nanometer range. Moreover, the hydrophobic particles employed in the present invention have an average particle diameter from 0.02 to 100 μm.

The hydrophobic properties of the particles may be inherently present by virtue of the material used for the particles, an example of such a case is polytetrafluoroethylene (PTFE). However, it is also possible to use hydrophobic particles that have hydrophobic properties as a result of suitable treatment, e.g. particles treated with at least one compound from the group of the alkylsilanes, the fluoroalkylsilanes, or the disilazanes. Particularly suitable particles are hydrophobicized fumed silicas, known as Aerosils. Aerosil® R 812S or Aerosil® R 8200 are examples of hydrophobic particles.

The surfaces produced by means of the process of the present invention preferably have a (circle-fitting) contact angle with respect to water of >100°, preferably >115°, more preferably >125° and even more preferably >130°. The absolute values given by the circle-fitting method using the Krüss DSA 10 device are lower than those from the traditional test method, but the circle-fitting method permits better assessment of the quality of a coating via additional dynamic evaluation.

The coatings of the present invention may be removed from the coated article in a simple manner by a mechanical operation, e.g. function, polishing, or high-pressure cleaners (water), but their adhesion to the substrates, e.g. articles, is sufficiently firm to provide their inventive functional properties for a period appropriate to practical use.

The process of the present invention can produce articles that have at least one surface that has been treated to give it a water- and dirt-repellent coating. The articles or the surfaces to be coated may be composed of a very wide variety of substances, e.g. metal, plastic, polymer, wood, ceramics, or glass.

The process of the present invention may further be used in impregnating sprays.

These sprays can be used to treat, for example, garden furniture, car wheel rims, car paints, showers, tiles, sanitary surfaces in general, laundries, and the like with detachable dirt- and water-repellent coatings.

The process of the present invention and its use is described by way of example below, but the example is not intended to restrict the invention.

Test Methods:

Coating of Surfaces:

The surfaces are coated by spray-application of the suspensions, using a solid-cone-spray-pattern nozzle, e.g. GSC-1 from Spraying-Systems GmbH. For this, 1.5 g of the suspension was weighed into a test tube, and the suspension was sucked by means of a rubber hose into the nozzle and sprayed onto the surface. Prior to and after the spraying process, the surface was weighed in order to determine the weight of the layer thickness applied.

Determination of Contact Angle:

Contact angle was determined using a DSA 10 from Krüss GmbH. For this, one droplet of distilled water with a volume of 7 μl was applied to the surface, and a high-speed camera was used to make an image of the droplet. Evaluation was by the circle-fitting method, by means of DSA version 1.80.1.2 [HS] software.

Determination of Gloss Value:

Gloss value was determined using a REFO 3-D from Lange GmbH. For this, gloss value was measured at three different points on the surface by means of measurement at three angles (20°, 60°, 85°). The average of these measurements represents the gloss value of the entire surface, where 1=very high gloss value and 6=matt surface.

Run-Off Performance:

The surface inclination of the coated substrate was 45°. 1=immediate, unhindered, and residue-free run-off of a water droplet of size about 500 μl, 6=droplet spreads, i.e. evaporation rather than roll-off.

Delay in Penetration:

1=no penetration, 6=no delay at all, immediate penetration.

Perception:

Overall sensory perceptual impression. 1=surface perceived as untreated and uncontaminated, 6=coating and contamination are very clearly detectable, i.e. are perceived as unattractive.

Overall Grade:

This is the arithmetic average of the assessed criteria. The lower the value, the more favorable the overall impression.

Method:

EXAMPLE 1 (COMPARATIVE)

0.5 g of polyoctadecyl vinyl ether with a molar mass of about 3 000 g/mol (Lutonal® A25) was dissolved in 98.5 g of petroleum spirit (boiling range from 90 to 100° C.), as in EP-A-1 153 987. 1.0 g of a commercially available, hydrophobicized fumed silica with a BET surface area of 220 m$^2$/g (Aerosil® R 812 S, hereinafter R 812 S) was dispersed in this solution, with vigorous stirring.

On white glazed tiles, this suspension gave a contact angle of 130° and a gloss value of 0.9 at 85°.

EXAMPLE 2

0.5 g of siloxane wax (Tegopren® 6814, hereinafter TP 6814) with a molar mass of 13 000 g/mol and a recrystallization point of <5° C. was dissolved in 98.5 g of decamethylcyclopentasiloxane (D5). 1.0 g of a commercially available, hydrophobicized fumed silica with a BET surface area of 220 m$^2$/g, (Aerosil® R 812 S) was dispersed in this solution, with vigorous stirring.

On white glazed tiles, this suspension gave a contact angle of 130° and a gloss value of 15.0 at 85°.

EXAMPLE 3

0.5 g of siloxane wax (Tegopren® 6814) with a molar mass of 13 000 g/mol and a recrystallization point of <5° C. was dissolved in 98.5 g of decamethylcyclopentasiloxane (D5). 1.0 g of a commercially available, hydrophobicized fumed silica with a BET surface area of 160 m$^2$/g, (Aerosil® R 8200, hereinafter R 8200) was dispersed in this solution, with vigorous stirring.

On white glazed tiles, this suspension gave a contact angle of 105° and a gloss value of 56.1 at 60°.

EXAMPLE 4

0.5 g of siloxane wax (Tegopren® 6814) with a molar mass of 13 000 g/mol and a recrystallization point of <5° C. was dissolved in 97.5 g of decamethylcyclopentasiloxane (D5). 2.0 g of a commercially available, hydrophobicized fumed silica with a BET surface area of 220 m$^2$/g, (Aerosil® R 812 S) was dispersed in this solution, with vigorous sting.

On white glazed files, this suspension gave a contact angle of 133° and a gloss value of 11.7 at 85°.

EXAMPLE 5

0.5 g of siloxane wax (Tegopren® 6814) with a molar mass of 13 000 g/mol and a recrystallization point of <5° C. was dissolved in 97.5 g of decamethylcyclopentasiloxane (D5). 2.0 g of a commercially available, hydrophobicized fumed silica with a BET surface area of 160 m$^2$/g, (Aerosil® R 8200) was dispersed in this solution, with vigorous stirring.

On white glazed files, this suspension gave a contact angle of 106° and a gloss value of 42.2 at 60°.

| Surface | Assessment criteria | Example 1 Petroleum spirit +0.5% Lutonal A25 +1.0% R 812 S | Example 2 +0.5% Tp 6814 +1.0% R 812 S to 100% D5 | Example 3 +0.5% Tp 6814 +1.0% R 8200 to 100% D5 | Example 4 +0.5% Tp 6814 +2.0% R 812 S to 100% D5 | Example 5 +0.5% Tp 6814 +2.0% R 8200 to 100% D5 |
|---|---|---|---|---|---|---|
| Lacquered sheet metal | Run-off behavior of water droplets | 2 | 1 | 4 | 1 | 2 |
| | Perception | 6 | 6 | 3 | 6 | 2 |
| | Gloss | 6 | 6 | 3 | 6 | 3 |
| | Overall grade | 4.7 | 4.3 | 3.3 | 4.3 | 2.3 |
| Glazed tile | Run-off behavior of water droplets | 2 | 1 | 4 | 1 | 3 |
| | Perception | 5 | 5 | 3 | 5 | 3 |
| | Gloss | 6 | 6 | 2 | 6 | 3 |
| | Overall grade | 4.3 | 4.0 | 3.0 | 4.0 | 3.0 |
| Porcelain tile | Run-off behavior of water droplets | 3 | 1 | 4 | 1 | 2 |
| | Perception | 5 | 4 | 1 | 4 | 2 |
| | Overall grade | 4.0 | 2.5 | 2.5 | 2.5 | 2.0 |
| Glass | Run-off behavior of water droplets | 4 | 1 | 4 | 1 | 2 |
| | Perception | 6 | 6 | 2 | 6 | 3 |
| | Transparency | 6 | 5 | 2 | 6 | 3 |

-continued

| Surface | Assessment criteria | Example 1 Petroleum spirit +0.5% Lutonal A25 +1.0% R 812 S | Example 2 +0.5% Tp 6814 +1.0% R 812 S to 100% D5 | Example 3 +0.5% Tp 6814 +1.0% R 8200 to 100% D5 | Example 4 +0.5% Tp 6814 +2.0% R 812 S to 100% D5 | Example 5 +0.5% Tp 6814 +2.0% R 8200 to 100% D5 |
|---|---|---|---|---|---|---|
| | Overall grade | 5.3 | 4.0 | 2.7 | 4.3 | 2.7 |
| Leather (untreated) | Run-off behavior of water droplets | 1 | 1 | 4 | 1 | 2 |
| | Perception | 6 | 3 | 2 | 5 | 1 |
| | Delay in penetration of water into the material | 4 | 3 | 4 | 2 | 3 |
| | Overall grade | 3.7 | 2.3 | 3.3 | 2.7 | 2.0 |

The table above clearly shows that variation in the ratio of Aerosil to adhesion promoter permits production of the most advantageous suspension for each use. However, on every surface tested the use of an adhesion promoter based on silicone wax is found to give a considerable improvement over the prior art.

While the present invention has been particularly shown and described with respect to preferred embodiments thereof, it will be understood by those skilled in the art that the foregoing and other changes in forms and details may be made without departing from the scope and spirit of the present invention. It is therefore intended that the present invention not be limited to the exact forms and details described and illustrated, but fall within the scope of the appended claims.

What is claimed is:

1. An impregnating composition for producing detachable surface coatings having dirt- and water repellant properties comprising a suspension including hydrophobic particles in a solution of a silicone wax in a highly volatile siloxane, wherein the silicone wax comprises at least one compound of general formula (II)

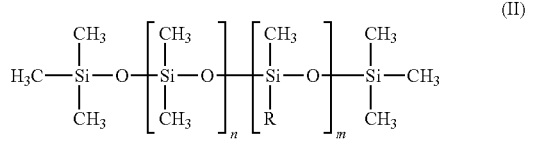

where
R is a hydrocarbon radical having from 10 to 20 carbon atoms,
n is from 2 to 85, and
m is from 2 to 60, the recrystallization points of said compounds of formula (II) is below about 20° C.

2. The composition as claimed in claim 1 wherein the highly volatile siloxane comprises at least one compound of general formula (I), a cyclic compound of general formula (Ia) or a mixture thereof

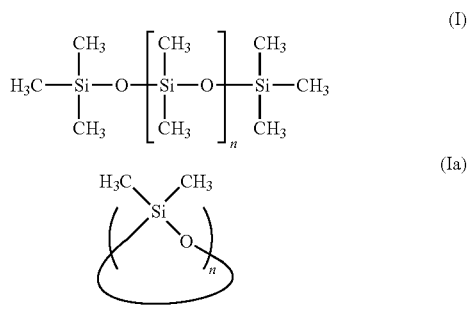

where
n is a number from 2 to 10.

3. The composition as claimed in claim 2, wherein the highly volatile siloxane is a compound of formula (I) wherein n is from 2 to 5.

4. The composition as claimed in claim 2, wherein the highly volatile siloxane is a compound of formula (Ia) wherein n is greater than or equal to 4 to less than or equal to 8.

5. The composition as claimed in claim 1, wherein the hydrophobic particles have a fine structure in the nanometer range.

6. The composition as claimed in claim 1, wherein the hydrophobic particles have an average particle diameter from 0.02 to 100 μm.

7. The composition as claimed in claim 1, wherein the hydrophobic particles are selected from the group consisting of hydrophobicized silicas, zinc oxide, titanium dioxide and mixtures thereof.

* * * * *